(12) United States Patent
Belser et al.

(10) Patent No.: US 6,788,641 B2
(45) Date of Patent: Sep. 7, 2004

(54) METHOD FOR PROVIDING TRACK POSITION AND IDENTIFICATION INFORMATION FOR DATA STORAGE DEVICES

(75) Inventors: Karl A. Belser, San Jose, CA (US); John H. Jerman, Palo Alto, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 282 days.

(21) Appl. No.: 09/911,552

(22) Filed: Jul. 23, 2001

(65) Prior Publication Data

US 2002/0080690 A1 Jun. 27, 2002

Related U.S. Application Data

(63) Continuation of application No. 09/152,356, filed on Sep. 14, 1998, now Pat. No. 6,264,848.
(60) Provisional application No. 60/081,253, filed on Apr. 9, 1998.

(51) Int. Cl.[7] .................................................. G11B 7/24
(52) U.S. Cl. ............................ 369/275.2; 369/275.4; 369/13.35; 216/22
(58) Field of Search ........................ 369/275.2, 13.15, 369/112.29, 13.12, 13.02, 275.3, 13.35, 275.1, 284, 286, 288, 277, 283, 275.4; 216/22, 38, 39, 88, 89, 99, 91; 428/64.3, 64.4; 360/59

(56) References Cited

U.S. PATENT DOCUMENTS

| | | | |
|---|---|---|---|
| 5,696,758 A | * | 12/1997 | Yanagimachi et al. ... 369/275.4 |
| 5,763,037 A | * | 6/1998 | Ohtomo et al. ............ 428/64.1 |
| 6,264,848 B1 | * | 7/2001 | Belser et al. ................. 216/22 |
| 6,400,677 B2 | * | 6/2002 | Kagawa et al. .......... 369/275.4 |

* cited by examiner

*Primary Examiner*—Ali Neyzari
(74) *Attorney, Agent, or Firm*—Moser, Patterson & Sheridan, LLP; Keith P. Taboada, Esq.

(57) ABSTRACT

Fabrication of an MO disc, the formation of a master pattern of servo and track information, and the subsequent transfer of that pattern to a series of pits and grooves on a substrate. On top of that substrate, at least one sacrificial layer is provided atop a relatively hard layer. The recording stack may be provided with both silicon nitride and silicon dioxide top layers, with the silicon dioxide layer acting as a sacrificial layer to ensure that the hard layer, of silicon nitride, remains at the end of the process. A layer of aluminum or aluminum alloy may be deposited, with the aluminum plugs filling the grooves and pits (created by the embossed servo information) to a level higher than any of the adjacent layers of silicon dioxide, silicon nitride, or similar dielectric layer. Since the polishing rate of aluminum can be far faster than that of the silicon dioxide, then the aluminum can be etched or otherwise removed down to a level equal to or slightly below a planar surface with the silicon dioxide, with the silicon dioxide layer allowing for some small level of over polishing. The silicon nitride layer is protected completely; the silicon dioxide layer partially remains and is partially removed; and the aluminum metal which fills the grooves and pits would rise only to a level substantially equal the very flat top surface of the silicon dioxide.

13 Claims, 7 Drawing Sheets

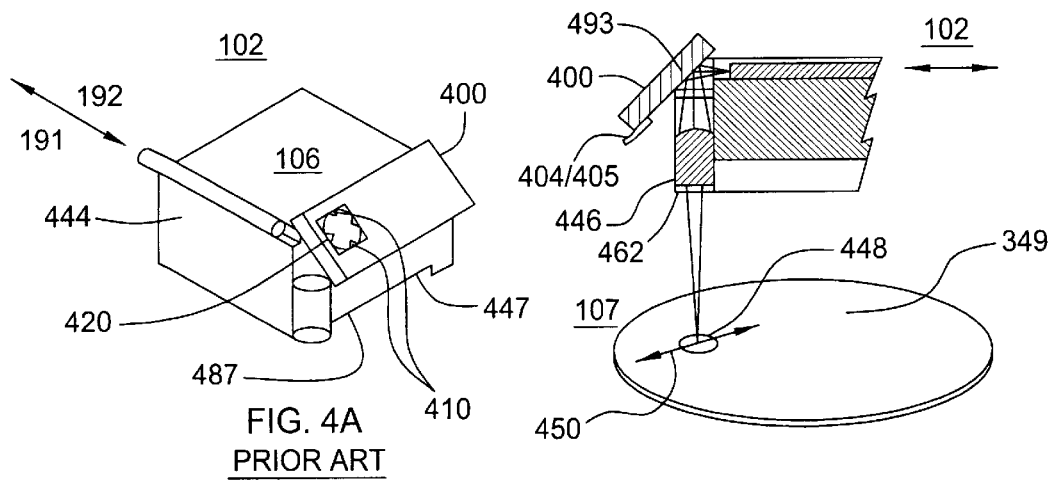
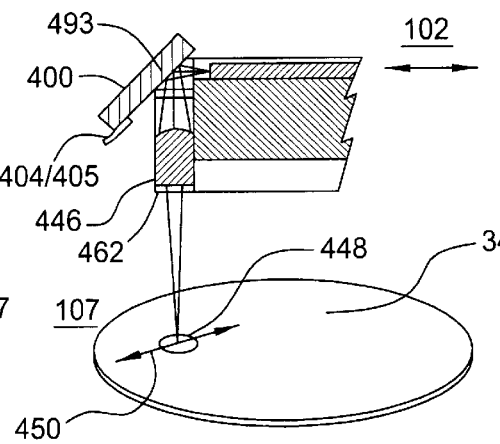
FIG. 4A
PRIOR ART
FIG. 4B
PRIOR ART
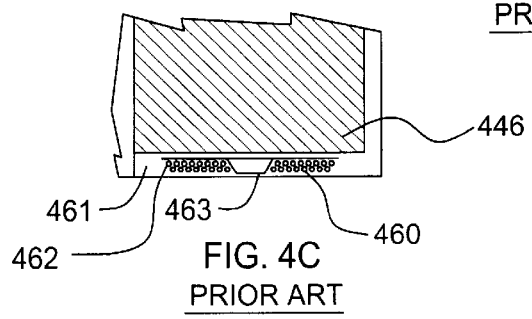
FIG. 4C
PRIOR ART
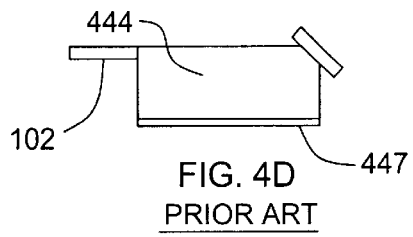
FIG. 4D
PRIOR ART
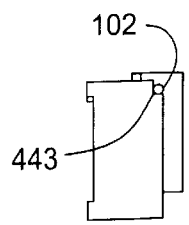
FIG. 4G
PRIOR ART
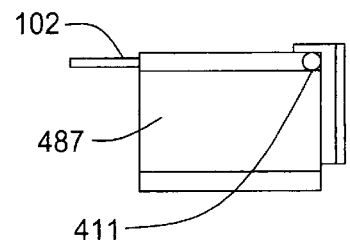
FIG. 4F
PRIOR ART
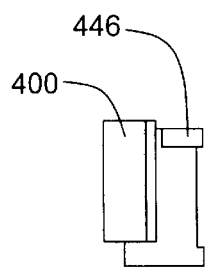
FIG. 4E
PRIOR ART

METHOD FOR PROVIDING TRACK POSITION AND IDENTIFICATION INFORMATION FOR DATA STORAGE DEVICES

This continuation application claims priority to U.S. application Ser. No. 09/152,356 filed Sep. 14, 1998 now U.S. Pat. No. 6,264,848 claim benefit of 60/081,253 filed on Apr. 9, 1998.

FIELD OF THE INVENTION

The present invention is directed to an improved method for manufacturing a data disc having embossed servo information to provide a smoother surface.

BACKGROUND OF THE INVENTION

Data storage on rotating media requires position sensing information to be included on a part of the data storage surface so that the data storage systems can retrieve information recorded on that surface. Prior art devices have traditionally used different methods for encoding and storing this position sensing information depending on the type of media and reading mechanism used.

Traditional Winchester magnetic storage systems have used magnetic signals recorded in the thin-film media surface for this purpose. These signals are typically recorded by the same systems used to write data to that surface in a process known as servo writing. The servo writing records information on the media about the identity and location of the data which is then used during the writing and reading processes to derive servo signals which allow for the accurate positioning of the head during these operations. Typically the data is arranged in a concentric series of tracks, each track being made up of a number of sectors, which in turn contain multiple bits of binary data. Since these signals are individually recorded by a single writing head on each recording surface of the storage system, the time required to complete this process is becoming increasingly lengthy as the total number of sectors and tracks increase.

Magneto-optical systems have traditionally used embossing processes which were originally developed for use in read-only, compact disc storage systems. Here the servo sector information is written using optical lithographic systems on the surface of a master disc. A series of pits and grooves is formed in this surface, which is then replicated onto the surface of a metal mold. Numerous plastic discs with accurate copies of this pattern are produced by injection molding processes. Since the molding operation is fast and low cost, the complete servo information is provided on the entire disc surface with this inexpensive process, making writing of individual sector information on the disc unnecessary.

Hybrid data storage systems have been previously described whereby a flying optical head is used to write and read data by means of a magneto-optical system. The media used in this system is similar to prior art magneto-optical system in that embossed servo information is used to locate the position of the head as it is flying over the media. The media is of the so-called first-surface variety, in that the thin film magnetic layer is on the outside surface of the data storage disc, rather than underneath a rather thick protective layer as is commonly used for prior art magneto-optical data storage systems. The embossed servo pits and grooves in a first-surface media are directly underneath the air bearing surface of the flying optical head, which affect the ability of the head to fly uniformly over the recording surface.

In such system the embossed pits are required to have very tight dimensional tolerances to perform adequately in their intended use. The depth of the pits and grooves must be controlled to a specific fraction of the wavelength of light used, for example, ¼ wavelength of 650 nm light. The observed servo signal is due to destructive interference between light reflected off of both surfaces, so that changes in the pit depth result in changes in the magnitude of the reflected optical signal. Since interference is used to generate the signal, significant lateral changes in the size of the spot can cause the adjacent pit edges to effectively overlap, reducing the magnitude and distorting the shape of the servo signal.

In traditional Winchester magnetic recording systems, the maximum data storage density is set by the product of the linear recording density, that is, the number of bits that can be recorded along the path of the flying head, and the track pitch, that is, the number of tracks per radial dimension on the rotating disc. The linear recording density is primarily set by the gap between the media and the writing and reading heads, assuming that the film thicknesses of the heads and discs can be made thin enough as described by the so-called Wallace and Potter equations. The track pitch is set more by the ability to position the head over a particular track, the fabrication control over the pole gap width, and the ability to minimize distortion of adjacent track information when writing a particular track. Limitations in areal data storage density in prior art systems are primarily due to these track pitch limitations.

This invention is directed at processes that use traditional embossing techniques to provide the servo and track location information required by both magnetic and magneto-optical systems. These processes then modify the embossed grooves by filing them with various materials and polishing the surface so that the embossed pits and grooves are selectively filled with the deposited material. In this way, the surface is made flat enough to provide a smooth surface for flying a head very close to this surface while maintaining the economical advantages of molding the servo information into the disc surface. The material in the filled grooves can be used for sector identification and track following and also as a magnetic or thermal barrier between adjacent tracks.

A primary element of this invention is the use of a differential removal process such as chemical-mechanical polishing (CMP), which is a process primarily used in the integrated circuit industry to control planarity of deposited and patterned layers. The deposited layers used to form insulating and conductive regions in integrated circuits are generally conformal, in the sense that their as-deposited thickness is constant regardless of the topology of the underlying regions. As multiple layers are deposited, patterned and etched, it becomes increasingly difficult to correctly perform the lithographic steps on surfaces that are no longer smooth and flat. Thus polishing steps are incorporated after deposition steps to return the surface to being flat and smooth, after which the required lithographic steps can be performed with sufficient accuracy. Both equipment and processes have been developed to polish various layers in the presence of other layers such that there is a large selectivity on the removal rate between different layers. The layers with the lower polishing rate form so-called etch-stops (actually polish-stops), which prevent further polishing after the lower polishing rate material is exposed.

SUMMARY OF THE INVENTION

The invention includes the formation of a master pattern of servo and track information and the subsequent transfer of that pattern to a series of pits and grooves on a substrate. On top of that substrate, at least one sacrificial layer is provided atop a relatively hard layer. By sacrificial layer it is meant that the layer is relatively easy to etch or otherwise remove in a controlled, planar step. By a hard layer, it is meant that the layer is relatively polish or etch resistant. A data storage layer may serve as this hard layer.

For example, in a magneto-optical design, the recording stack may be provided with both silicon nitride and silicon dioxide top layers, with the silicon dioxide layer acting as a sacrificial layer to ensure that the hard layer, of silicon nitride, remains at the end of the process. In a further alternative, a layer of aluminum or aluminum alloy may be deposited, with the aluminum plugs filling the grooves and pits (created by the embossed servo information) to a level higher than any of the adjacent layers of silicon dioxide, silicon nitride, or similar dielectric layer. Since the polishing rate of aluminum can be far faster than that of the silicon dioxide, then the aluminum can be etched or otherwise removed down to a level equal to or slightly below a planar surface with the silicon dioxide, with the silicon dioxide layer allowing for some small level of over polishing. The net result would be that the silicon nitride layer would be protected completely; the silicon dioxide layer would partially remain and partially be removed; and the aluminum metal which fills the grooves and pits would rise only to a level substantially equal the very flat top surface of the silicon dioxide. Of course, alternative filler materials could be used in a similar process as long as an appropriate selective removal process is available with sufficient selectivity. In this example, the aluminum functions as a sacrificial layer; the silicon dioxide is effectively serving as a "hard" layer, as it is removed more slowly. In an alternative, the silicon dioxide layer could be omitted, with the silicon nitride layer now being the "hard" layer.

For conventional Winchester magnetic recording discs, the grooves could be filled with a non-magnetic material such as aluminum, glass or polymer, such as polyamide, or a magnetic material of higher or lower permeability, coercivity, or susceptibility and polished smooth. Such filler material again is selected on the basis of its removal selectivity relative to the basic "hard" material of a magnetic recording disc.

Other features and advantages of the present invention will become apparent to a person of skill in the art who studies the following invention disclosure given with respect to the following disclosure.

BRIEF DESCRIPTION OF THE DRAWINGS

The present invention can be better understood by reference to and review of the following drawings:

FIGS. 4A–4F are views from various angles and with varying degrees of detail of a slider and the optics supported on the slider in a magneto-optical disc drive;

DETAILED DESCRIPTION OF THE PREFERRED EMBODIMENTS

The present invention of a method for providing track position and identification information for data storage device is useful in both magneto optical systems and in traditional Winchester magnetic storage systems. Therefore, a brief description of the basic elements of each system will be provided. However, the necessary servo information which is a part of the invention, is a series of pits and grooves formed on or readable through the surface of the disc, requiring an optical reader. Therefore, a brief description of the basic elements of an optical reading system are also included. Such a system, or other such systems which may be developed, might in some embodiments be incorporated in the traditional Winchester magnetic storage systems in order to fully implement this invention. Further, this invention is not to be limited to this specific optical reading system which is disclosed in this application or any equivalent thereof, as the disc, as formed, may be read in any of a number of ways, known and unknown at this period of time. This invention is concerned with the disc, and the method of making the disc.

Figure 1A:
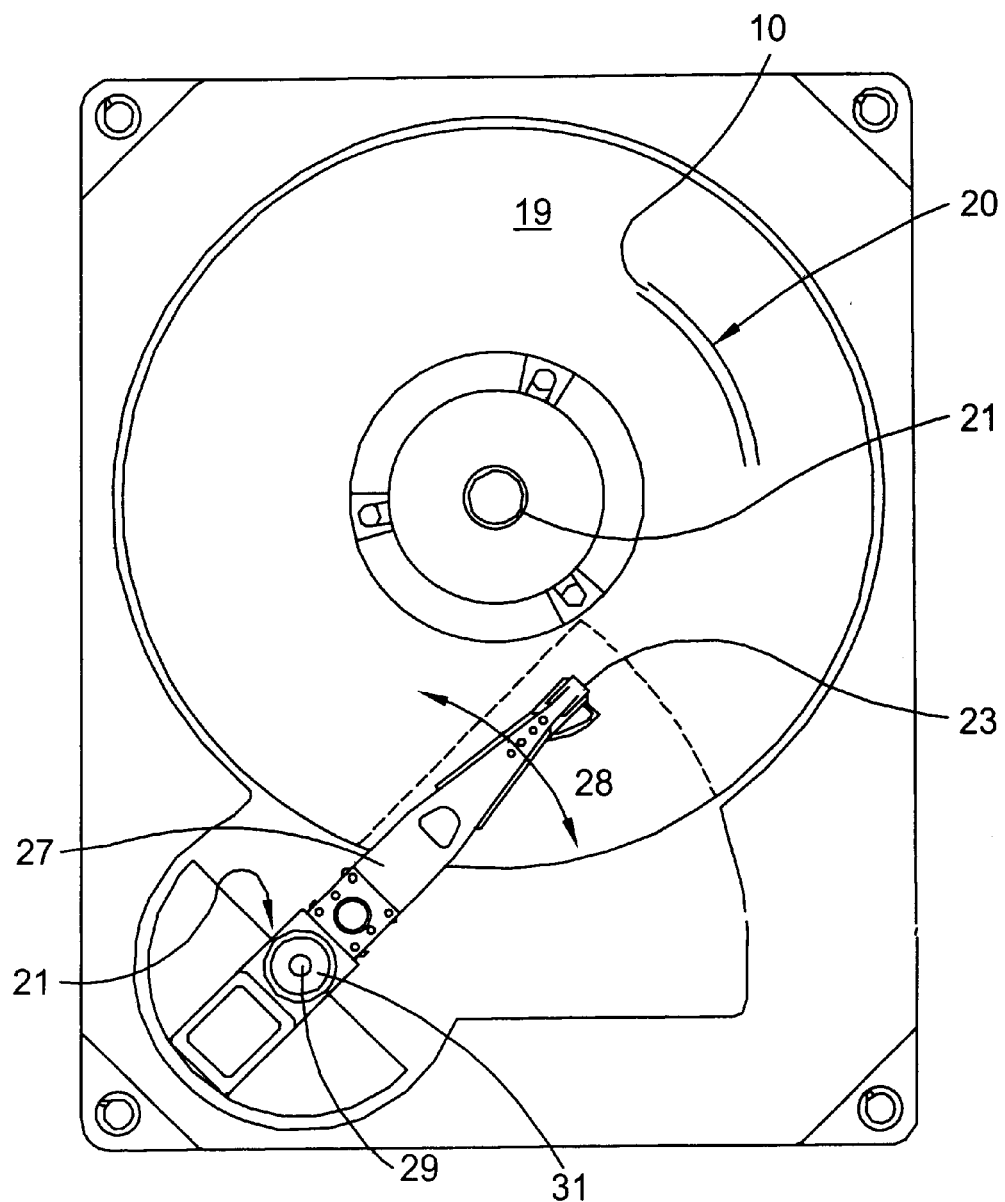
FIG. 1A is a top plan view illustrating some of the basic elements of a Winchester type magnetic disc drive.

Therefore, a brief description of the basic elements of a typical Winchester magnetic storage system can be found in FIG. 1A, which shows a rotating disc 19 on which a number of data tracks generally indicated at 20 can be found. Typically the data is arranged in a concentric series of these tracks, with each track being made up of a number of sectors which in turn contain multiple pits of binary data. The servo information is typically recorded in the space 10 between these tracks; typically in using the invention to be described below, the information would be embossed on the surface of the disc or otherwise formed as a series of pits and grooves in the data recording surface. In forming a Winchester storage system disc, the pits and grooves for each track of servo data could be created as a part of the forming or molding process which is used to form the disc. The type of materials of which such magnetic storage disc are currently formed have been well identified and described in a number of published documents, and need not be further described herein. The data would be both written and read on the data tracks 20 which would be found between the servo track regions 10 by a transducer 23 supported on an actuator 27 for radial movement in the direction of arrow 28. The movement is caused by a motor generally indicated at 29 which causes rotation of the actuator 27 about an actuator bearing 31 and pivot 29.

A typical magneto optical system will now be described beginning with FIG. 1B and continuing through FIGS. 2, 3 and 4A through 4F. These Figures are provided to both to show the general structure of a magneto optical system as well as a exemplary description of the necessary optics for reading. The pits and grooves which are formed in the surface of the disc to convey the desired servo information.

Figure 1B:
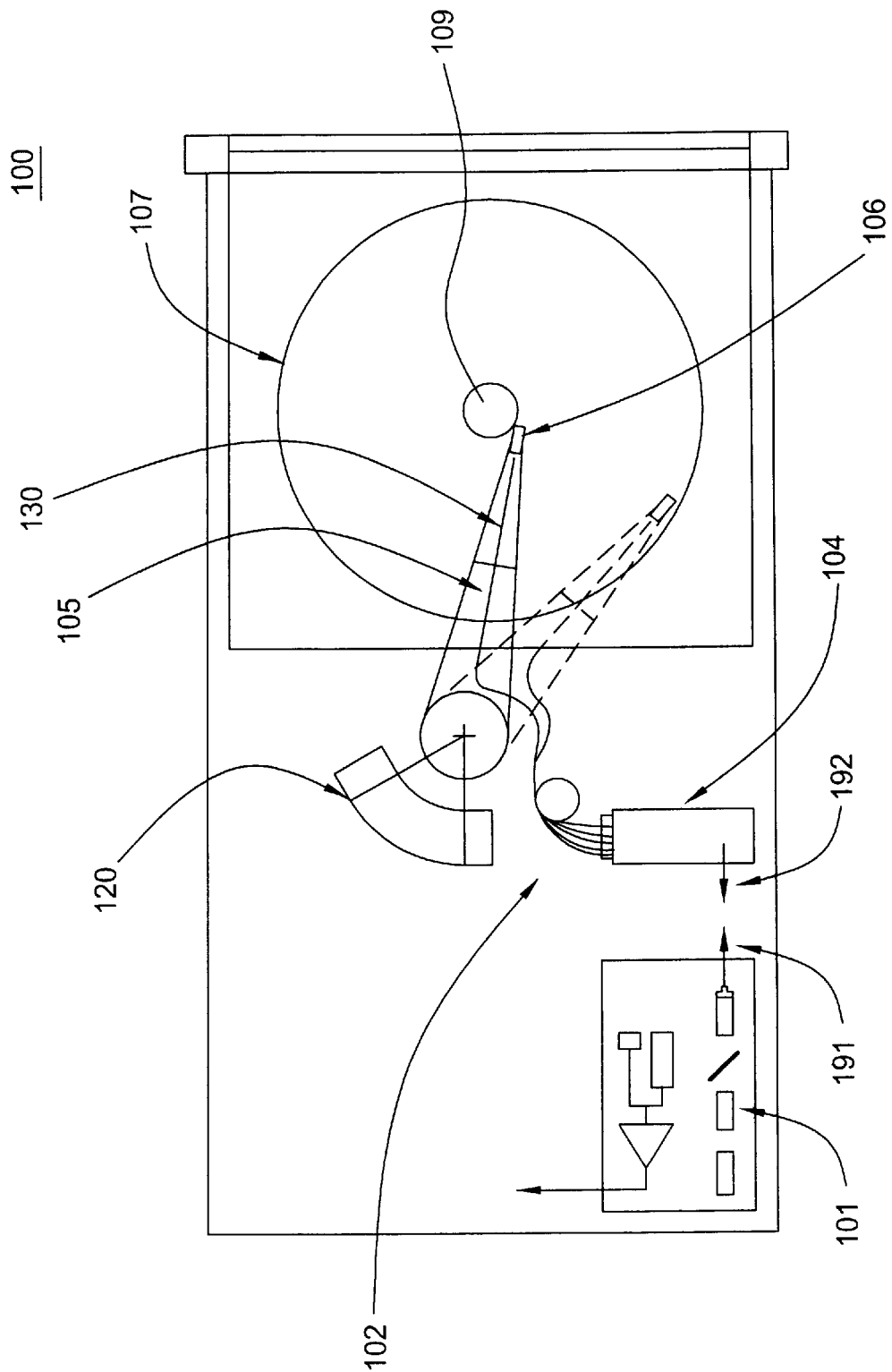
FIG. 1B is a top plan view of the basic elements of a magneto-optical disc drive.

Referring now to the drawings, FIG. 1B is a plan view illustrating some of the basic elements of a magneto-optical data storage and retrieval system. Few specific details are identified in this and FIGS. 2 through 4 4F as they are intended to portray some of the basic elements of a functional system in which the present invention is useful. The invention is not limited to use in only one specific MO data storage system.

FIG. 1, the system 100 includes a set of flying heads 106 whose details will be described below that are adapted for use with MO discs 107. In the example, the discs are double sided. One flying head 106 is provided for each MO disc surface 107. The heads 106 are coupled to a rotary actuator magnet and coil assembly 120 by a suspension 130 and actuator arm 105 to be positioned over the surfaces of the MO discs 107. In operation, the MO discs 107 are rotated by a spindle motor 109 to generate aerodynamic lift forces between the flying heads 106 and the rotating disc. This maintains each flying MO head 106 in a flying condition above the data recording surface of each MO disc. The lift forces are opposed by equal and opposite spring forces supplied by the suspensions 130. During non-operation, each flying MO head is maintained statically in a storage condition away from the surface of the MO disc 107, typically on a ramp (not shown) adjacent to the disc surface. It is of course possible that the heads could be landed on the surface of the disc in a non-data storage region; however, such an approach would not be the optimum approach.

System 100 further includes a laser-optics assembly 101, an optical switch 104, and a set of single mode PM (polarization maintaining) optical fibers 102. In the exemplary embodiment, each set of single mode PM optical fibers 102 are coupled through a respective one of the set of actuator arms 105 and suspensions 130 to a respective one of the set of flying MO heads 106.

Figure 2:
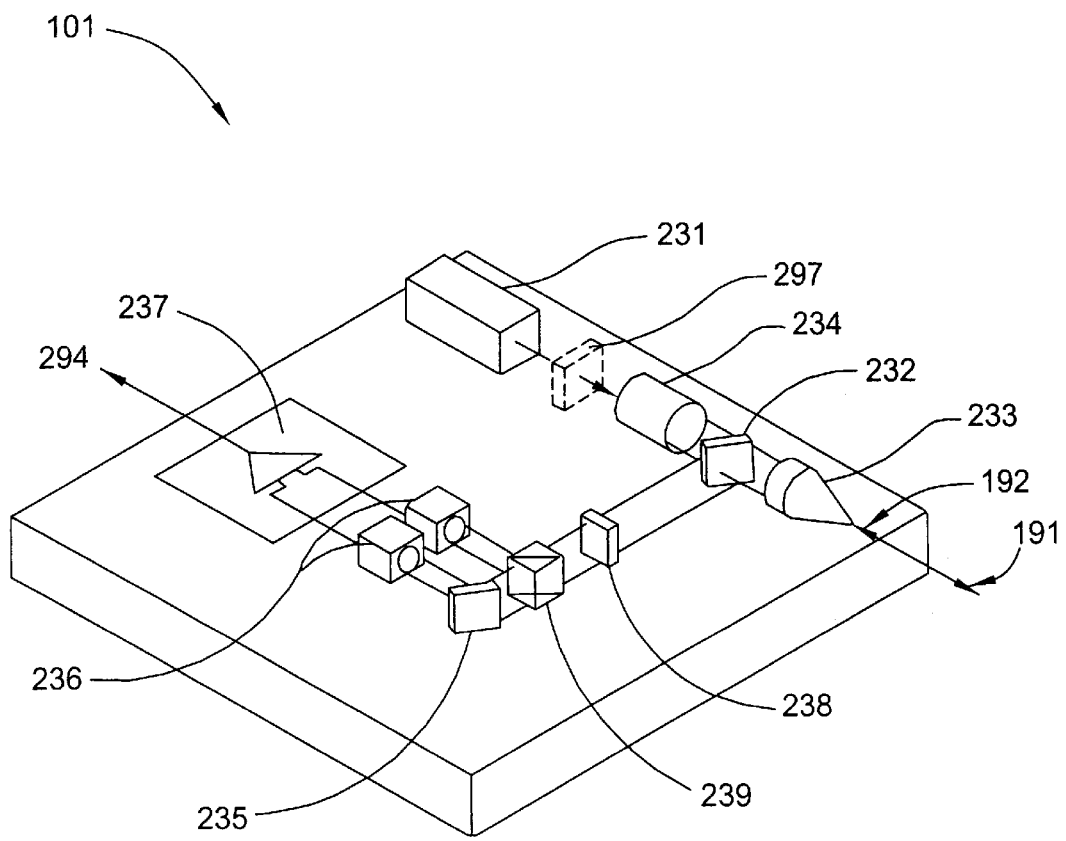
FIG. 2 illustrates the primary optical paths and some basic electrical elements of a magneto-optical disc drive in which this invention is useful.

FIG. 2 is a diagram showing the laser-optics assembly 101 of the magneto-optical data storage and retrieval system of FIG. 1. As will now be explained with respect to FIGS. 2 and 3, reading and storing information on the surface of each disc 107 requires both conveying the output of a laser through a fiber-optic to the flying head so that the light output is accurately imaged on the surface of the disc and generating a magnetic field utilizing a coil which is supported on the flying head 106 near to the surface of the disc. The description of FIGS. 2 and 3 will briefly summarize the reasons for providing both a light source and a magnetic field to selectively access the data on the surface of the disc. In FIG. 2, the laser-optics assembly 101 is shown to include a linearly polarized diode laser source 231 operating in a visible or near ultraviolet frequency region and emitting an optical power sufficient for reading and writing using the set of MO discs 107. In a first embodiment, the laser diode source may be a RF modulated laser source. In a second embodiment, the linearly polarized laser source 231 may be a distributed feed-back (DFB) laser source. In an exemplary embodiment, the linearly polarized laser source 231 is selected to operate within a range 635–685 nm; however, a laser source of other wavelengths could also be used. The laser-optics assembly 101 further includes: a collimating optics 234, a low wavelength dispersion leaky beam splitter 232, and a coupling lens 233. The laser-optics assembly 101 directs (from the linearly polarized laser source 231) a linearly polarized outgoing laser beam (shown in FIG. 1) to the optical switch 104. The laser-optics assembly 101 further includes: a ¼ wave plate 238, a mirror 235, and a polarizing beam splitter 239. In the first embodiment, a linearly polarized reflected laser beam 192 (shown in FIG. 1) is directed by the optical switch 104 to the coupling lens 233, and is routed by the leaky beam splitter 232 to a differential detector comprising: the ¼ wave plate 238, the mirror 235, and the polarizing beam splitter 239. In the second embodiment, an optical isolator 297 is included between the laser source 231 and the collimating lens 234. As is well established in the art, this type of differential detection scheme measures the optical power in two orthogonal polarization components of the reflected laser beam 192, with a differential signal being a sensitive measure of polarization rotation induced by the Kerr effect at the surface of one of the set of MO discs 107. In both embodiments, after conversion by a set of photodiodes 236, the differential signal is processed by the differential amplifier 237 for output as signal 294. The present invention is not meant to be limited to the aforementioned arrangement of optical elements and sources of light, as other techniques for directing the outgoing laser beam 191 and for detecting the reflected laser beam 192 are well known in the art.

As is also well established in the art, the sum of the signals from photo diodes 236 as generated by summing amplifier 237a in FIG. 2 produces a signal 249a whose amplitude is proportional to the light reflected from the disc. The reflectivity changes of the media can be caused by pits in the media that cause a loss of return light due to destructive interference. The reflectivity changes can also be caused by difference in material properties that fill the pits. Reflectivity information is used for encoding position information on the media.

Figure 3:
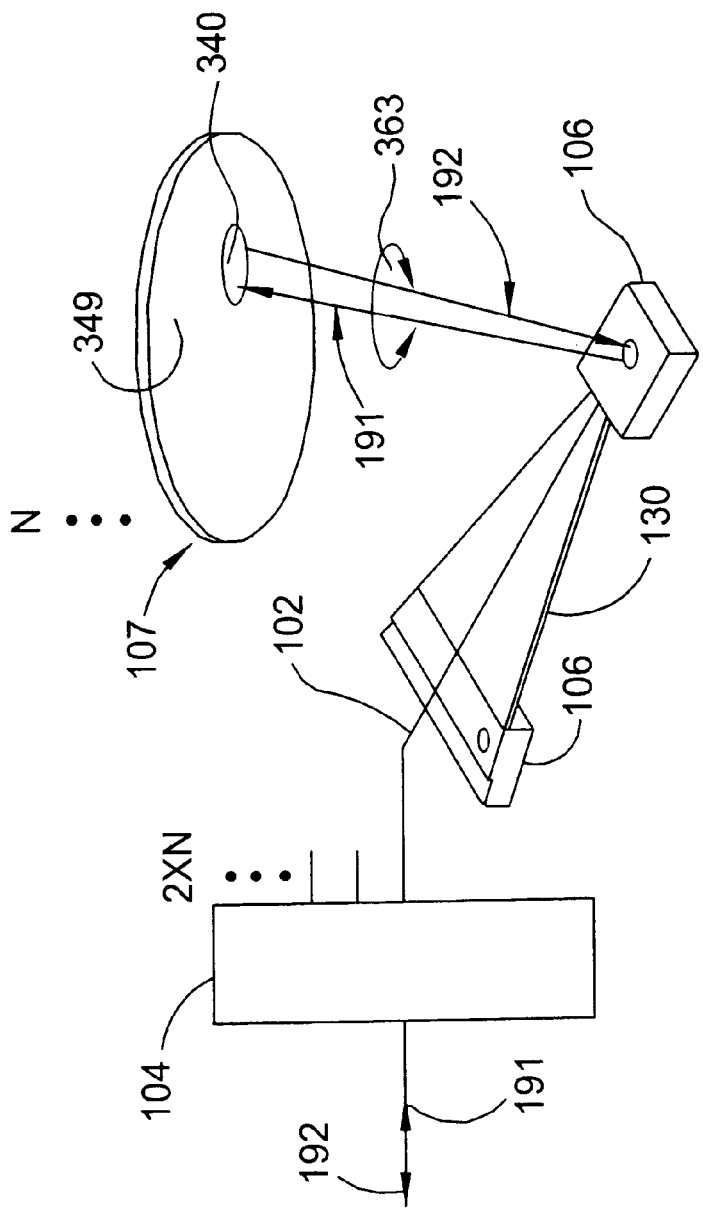
FIG. 3 is a schematic view showing the actuator arm, slider and disc of a magneto-optical disc drive.

FIG. 3 is a diagram showing a representative optical path that includes the use of a DFB laser source. In a preferred embodiment, a representative optical path is shown in FIG. 3 to include: the optical switch 104, one of the set of single-mode PM optical fibers 102, and one of the set of flying MO heads 106. The optical switch 104 provides sufficient degrees of selectivity for directing the outgoing laser beam 191 (with reference to laser source 231) to enter a respective proximal end of a respective single-mode PM optical fiber 102. The outgoing laser beam 191 is further directed by the single-mode PM optical fiber 102 to exit a respective distal end so as to pass through the flying MO head 106 onto a recording/storage layer 349 of a respective MO disc 107.

In the preferred embodiment the outgoing laser beam 191 is provided by a linearly polarized laser source 231 that is a DFB laser source. A distributed feed-back (DFB) diode laser source, unlike an RF-modulated Fabry-Perot diode laser, produces a very narrowband single-frequency output due to the use of a wavelength selective grating element inside the laser cavity. When linearly polarized light from a laser source 231 that is a DFB laser source is launched into a single-mode PM optical fiber 102, the light exiting the optical fiber includes a polarization state that depends on the relative orientation between the fiber axes and the incident polarization, and moreover, the output polarization state is very stable in time as long as external perturbations which alter the fiber birefringence are negligible. The present invention identifies that a DFB laser source enables use of the single-mode PM optical fiber 102 for delivery and return of polarized laser light to and from the MO disc 107.

During writing of information, the outgoing laser beam 191 is selectively routed by the optical switch 104 to the MO disc 107 so as to lower a coercivity of the recording/storage layer 349 by heating a selected spot of interest 340 to approximately the Curie point of the recording/storage layer 349. Preferably, the optical intensity of outgoing laser beam 191 is held constant, while a time varying vertical bias magnetic field is used to define a pattern of "up" or "down" magnetic domains perpendicular to the MO disc 107. This technique is known as magnetic field modulation (MFM). Alternatively, outgoing laser beam 191 may be modulated in synchronization with the time varying vertical bias magnetic field at the spot of interest 340 in order to better control domain wall locations and reduce domain edge jitter. Subsequently, as the selected spot of interest 340 cools, information is encoded within the recording/storage layer 349 of the respective spinning disc 107.

During readout of information, the outgoing laser beam 191 (at a lower intensity compared to writing) is selectively routed to the MO disc 107 such that at any given spot of interest 340, the Kerr effect causes (upon reflection of the outgoing laser beam 191 from the recording/storage layer 349) a reflected laser beam 192 to have a rotated polarization of either clockwise or counter clockwise sense 363 that depends on the magnetic domain polarity at the spot of interest 340.

The aforementioned optical path is bi-directional in nature. Accordingly, the reflected laser beam 192 is received through the flying MO head 106 and enters the distal end of the single-mode PM optical fiber 102. The reflected laser beam 192 propagates along the single-mode PM optical fiber 102 to exit at its proximal end and is selectively routed by the optical switch 104 for transmission to laser-optics assembly 101 for subsequent conversion to the signal 294.

FIGS. 4A–G are diagrams showing the flying magneto-optical head of the magneto-optical data storage in a perspective, a side cross-sectional, an expanded cross-section, a side, a front a bottom, and a rear view, respectively. In FIG. 4A, the flying MO head 106 is shown for use above a recording storage layer 349 of one of the set of MO discs 107. The flying MO head 106 includes: a slider body 444, an air bearing surface 447, a quarter-wave plate 493, a reflective substrate 400, objective optics 446, a magnetic coil 460, and a yoke 462. The slider body 444 is dimensioned to accommodate the working distances between the objective optics 446, the single-mode PM optical fiber 102, and the reflective substrate 400. The reflective substrate 400 may include a reflective surface which is aligned so as to direct the outgoing laser beam 191 and 192 to and from the recording/storage layer 349. Although slider body 444 may include industry standard "mini ", "micro", "nano", or "pico" sliders, alternatively dimensioned slider bodies 444 may also be used. In the preferred embodiment, the slider body 444 comprises a mini slider height (889 μm) and a planer footprint area corresponding to that of a nano slider (1600×2032 μm).

The single-mode PM optical fiber 197 is coupled to the slider body 444 along an axial cutout 443, and the objective optics 446 is coupled to the slider body 444 along a vertical corner cutout 411. Preferably, the cutouts 443 and 411 may be designed as channels, v-grooves, or any other suitable means for coupling and aligning the single-mode optical fiber 97 and objective optics 446 to the flying MO head 106. In this embodiment, the laser beams 191 and 192 traverse an optical path (to and from the recording/storage layer 349 of the MO disc 107) that includes: the single-mode PM optical fiber 197, the reflective substrate 400, the quarter-wave plate 493, and the objective optics 446. In this embodiment, the single-mode PM optical fiber 197 and the objective optics 446 are positioned within their respective cutouts to achieve focus of the outgoing laser beam 191 within the spot of interest 340 (see FIG. 3) as a focused optical spot 448. The single-mode PM optical fiber 197 and the objective optics 446 may be subsequently secured in place by using ultraviolet curing epoxy or similar adhesive.

Figure 5A:
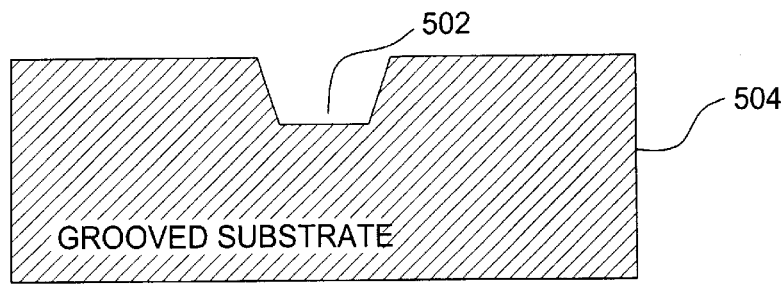
FIGS. 5A–D is a sequence of cross sections showing the process for utilizing the invention to fill the grooves on a magneto-optical disc.

The present invention includes the formation of a master pattern of servo track information and the subsequent transfer of that pattern to a series of pits and grooves on a substrate. This could be done with conventional injection molding technology to make a plastic substrate of a material such as polycarbonate, or by alternate prior art techniques such as the embossing of a relatively thin polymer layer on a substrate of polished glass or aluminum. Alternatively, the pits and grooves can be defined by applying a photo sensitive mask layer on a substrate such as glass or aluminum, photo lithographically defining the desired pit and groove regions and the photo sensitive layer, and etching the substrate by means such as reactive ion etching or ion milling followed by removal of the photo sensitive layer. A further alternative would be applying a photo sensitive layer of the desire thickness to a substrate material, and the pits and grooves defined directly in the photo sensitive layer by means of a photo lithographic step. Other approaches to defining the pit groove pattern in the substrate of a magnetic or magneto optical disc can be defined, or have already been defined and do not comprise a restraint on or a part of this invention. The substrate after this step with the pits and grooves formed in the surface of the disc is shown schematically in the cross-section of FIG. 5A with the pit or groove appearing at 502 and the substrate, generally referred to as disc substrate as 504.

For all the techniques described above and other similar techniques, except for differential etching into a glass substrate, the pits and grooves which define the servo information are defined in a relatively soft substrate, typically either plastic or aluminum or equivalent. For the later differential removal step, of which the example to be discussed is chemical mechanical polishing (CMP) a relatively hard and polish resistant layer is needed over the substrate containing the servo information in order to define as nearly as possible the finished elevation of the disc being prepared.

Figure 5B:
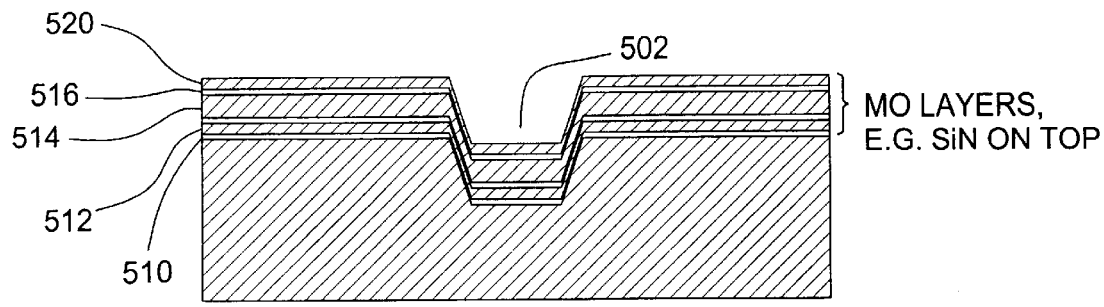
Figure 6B:
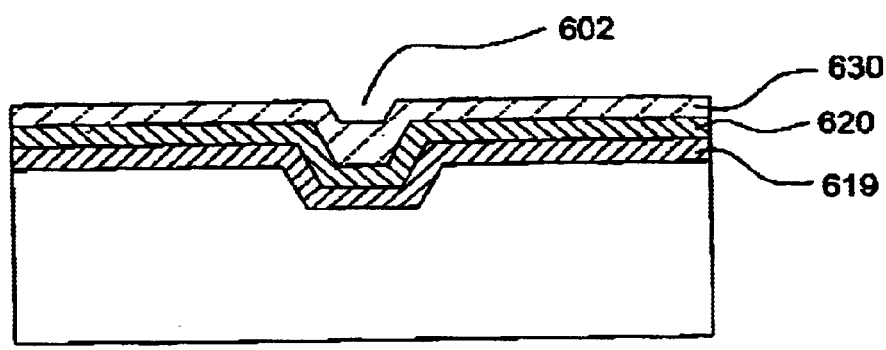
FIGS. 6B and 6D correspond to FIGS. 5B and 5D and illustrate a potential use of the inventive process in a conventional Winchester recording disc.

For example, in a magneto optical first surface recording layer type of disc, the prior art technology utilizes a sequence of layers to control thermal, magnetic, and optical performance of the recording layer. Such layers in a typical first surface design may include a lower thermal spreader layer 510, a dielectric isolation layer 512, a magnetic writing layer 514, a magnetic reading layer 516 and a top dielectric layer 520. The thickness of each of these layers is about 50 nm. The dielectric layers 512, 520 can be silicon nitride and/or sputtered silicon dioxide which are both relatively polish resistant and thus can potentially function as the hard layers in the differential removal process. The cross-section after this step is shown in FIG. 5B. Once again, it must be remembered that this is just an exemplary sequence of layers and that the present invention is not limited to use with such a sequence of layers, but rather can be easily adapted for use with any magneto optical or magnetic recording disc. For example, for a conventional magnetic recording system, a single conventional magnetic recording layer 619 is used follow by a thin (perhaps 50 nm) layer 620 as a polish stop as shown in FIG. 6B. For either the magneto optical case or the magnetic case, the next deposited layer is to be the sacrificial softer or more easily polished layer which is also to be the one to fill the embossed grooves.

In a conventional embossing process for optical data storage, the pit depth of each pit or groove 502 (or in FIG. 6B) pit 602 is about ¼ wavelength of, for example, red light, or about 160 nm deep. For the proposed filled groove process, however, more variation can be allowed as the pit depth need only be filled by the deposited material. There should be sufficient selectivity between the soft, filler material and the polish stop material so that the total thickness of the filler material can be polished away from the top of the polish stop layer 520, 620 in most embodiments.

Figure 5C:
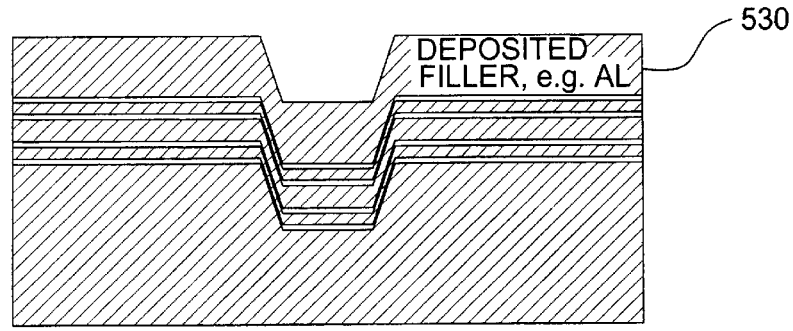
Figure 5D:
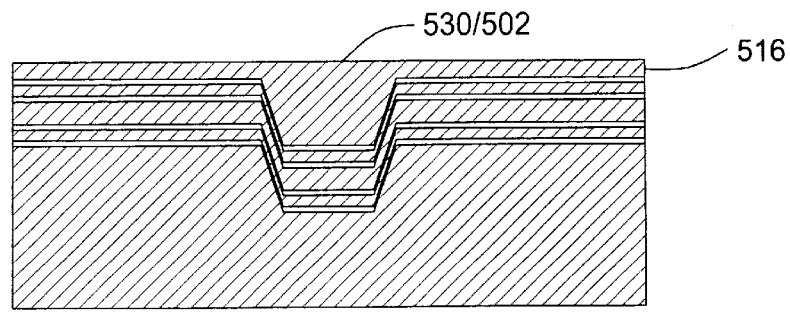

Considering next the embodiment of the magneto optical case which is shown in the sequence of FIGS. 5A–5D. The recording stack described above (which may take many forms other than that described above in this specific example) is provided with both a silicon nitride layer 516 and silicon dioxide layer 520. The silicon dioxide layer 520 will act as a sacrificial layer to insure that the correct silicon nitride layer thickness remains at the end of the chemical polishing or other etching process. The filler material 530, shown in FIG. 5C is then deposited, or otherwise laid down on top of these layers. For example, one filler material could be sputtered aluminum or aluminum alloy. A typical thickness would be about twice the depth of each groove 502. Thus, for the present case where, as defined, the pit depth is about 160 nm deep, then the depth of the filler material would be about 300 nm. The cross-section of the substrate with the layers at this point shown in FIG. 5C. The data storage disc is then subjected to a differential removal process which removes filler material but is stopped or substantially stopped by the harder layer, in this case, silicon dioxide 520. A useful process is polishing with a CMP process developed for the IC industry such as described in a paper by WANG et al., "Chemical-Mechanical Polishing Of Dual Damascene Aluminum Interconnects Structures", Semiconductor International, 1/95. This process uses commercially available equipment and materials to provide polishing selectivity of about 100 between the aluminum filler material 530 and the deposited silicon dioxide layer 520. Thus in this particular example, in polishing all 300 nm of the filler material and with 50% over polishing, less than 2 nm of the sacrificial silicon dioxide layer 520 would be expected to be removed. The resulting surface would, of course, be substantially flat. The oxide layer could then be etched with a wet chemical etchant which does not appreciably etch the underlying silicon nitride layer 516, to leave the magneto optical layer stack intact but with aluminum plugs filling the grooves and pits 502. The surface of this disc, as shown in FIG. 5D, should now have a maximum height disturbance approximately the same as the thickness of the sacrificial oxide thickness (perhaps 10–15 nm) about a factor of 10 less than before.

In a further improvement, if a small reduction in the top silicon nitride layer thickness can be tolerated, the no sacrificial oxide layer would be needed, and the top surface would be even more flat and smooth.

Alternative filler materials for the filler 530 can be used in a similar process as long as an appropriate CMP step, process, and removal process is available with sufficient selectivity. For example, the magneto optical case of FIGS. 5A–D, it is useful to fill the grooves with a material with relatively low thermal conductivity such as silicon dioxide rather than the aluminum. An appropriate CMP process exists for polishing oxide and stopping on silicon nitride, again with a selectivity of about 100 to 1. The oxide transparent groove depth would need to be reduced to about 120 nm to adjust for the refractive index of silicon dioxide of about 1.45. This glass could be used for servo pits and grooves or alternatively for providing a very narrow thermal barrier between tracks to reduce cross-talk between adjacent tracks. Since the glass is transparent, it would be possible to write information through the glass filler, allowing data to be written in the servo regions, or in circumferential grooves in the substrate, expanding the data handling capacity of the disc without a significant deterioration in the ability of the disc to read or write data.

Figure 6D:
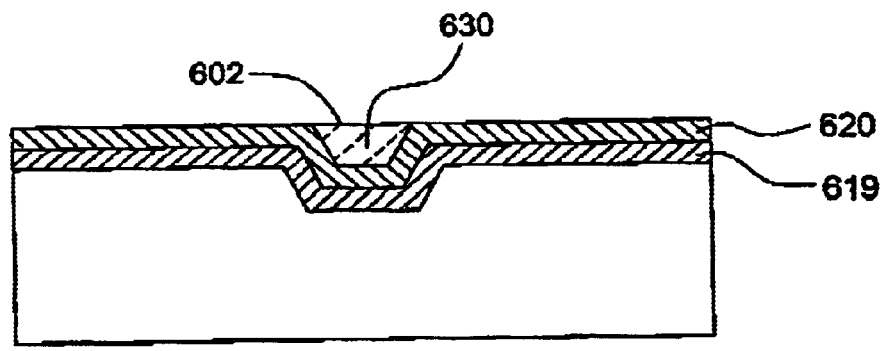

Returning to FIG. 6D, for conventional Winchester magnetic recording, the grooves 602 could be filled with a non-magnetic material filler material 630, such as aluminum, glass or a polymer such as polyamide or a magnetic material of differing permeability, coercivity, or susceptability and polished smooth. By polishing smooth, we mean using the same differential removal process, preferably the CMP process, as described above. As shown in FIG. 6D, the differential removal is carried out as described with respect to FIG. 5D until a substantially flat surface is achieved. The filled groove 602 can then fill two functions, storing servo information and providing a lateral magnetic track stop to help minimize and localize the width of the magnetic track, thereby increasing track density and minimizing adjacent track cross-talk.

Other features and advantages of the present invention will become apparent to a person of skill in the art who studies the present invention disclosure. Therefore, the scope of the present invention is to be limited only by the following claims.

What is claimed is:

1. A magneto optical disc, comprising:
   a substrate;
   a magneto optical recording layer selected and adapted for storing data and magneto optical format;
   a dielectric layer over said magneto optical recording layer;
   a surface of said disc comprising a series of depressions comprising pits and/or grooves for conveying servo information to an optical reader;
   and a filler material deposited in said depressions substantially to the height of said dielectric layer and appearing substantially transparent to an optical read head reading said servo information.

2. A disc as claimed in claim 1 wherein said filler material is a metal.

3. A Winchester magnetic recording disc, comprising:
   a disc substrate having grooves in a surface of said disc substrate for storing servo information and/or providing a lateral magnetic track stop;
   a top surface of said substrate including the internal walls of said groove having a thin layer of dielectric material; and
   a filler material in said groove which is substantially transparent to a transducer reading servo or data information in said grooves.

4. A Winchester magnetic recording disc as claimed in claim 3 wherein said filler material is aluminum, glass, a polymer, or a magnetic material of high or low permeability, susceptibility or coercivity.

5. A Winchester magnetic recording disc as claimed in claim 3 wherein said dielectric material comprises silicon nitride.

6. A disc as claimed in claim 1 wherein said dielectric comprises silicon nitride.

7. A Winchester magnetic recording disc, comprising:
   a disc substrate having a plurality of features formed a top surface of said disc substrate for storing servo information and/or providing a lateral magnetic track stop;
   a thin layer of dielectric material disposed on the top surface end the features; and
   a filler material disposed in the feature over the dielectric material which is substantially transparent to a transducer reading servo or data information in the features.

8. The Winchester magnetic recording disc of claim 7, wherein said filler material is at least one of aluminum, glass, a polymer, or a magnetic material.

9. The Winchester magnetic recording disc of claim 7, wherein said filler material is a magnetic material of high or low permeability, susceptibility or coercivity.

10. The Winchester magnetic recording disc of claim 7, wherein said dielectric material comprises silicon nitride.

11. The Winchester magnetic recording disc of claim 7, wherein said features are at least one of grooves, pits, depressions or embossings.

12. The Winchester magnetic recording disc of claim wherein said features are embossed or molded in the top surface.

13. The Winchester magnetic recording disc of claim 7, wherein said filler material and said dielectric layer have a coplanar upper surface.

* * * * *